United States Patent Office 3,101,768
Patented Aug. 27, 1963

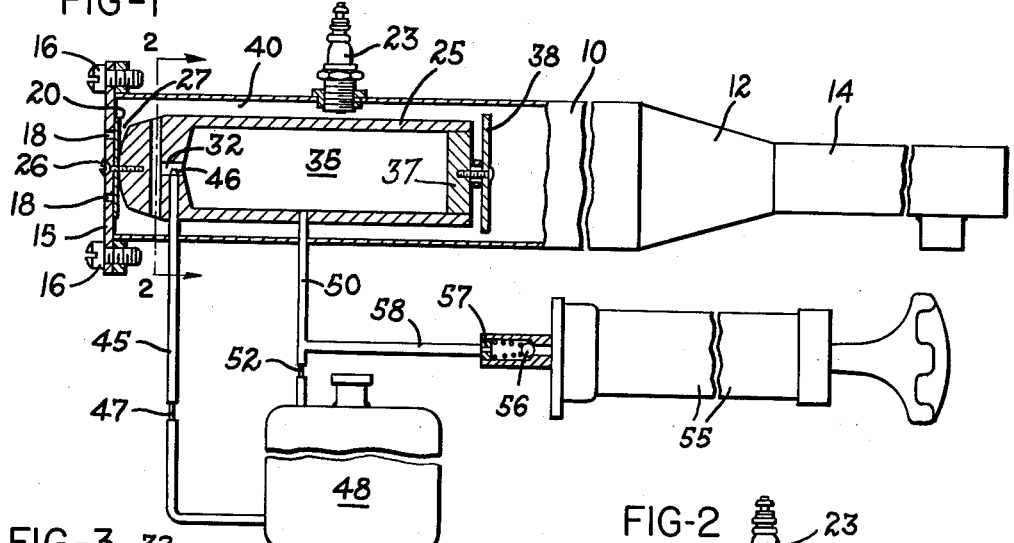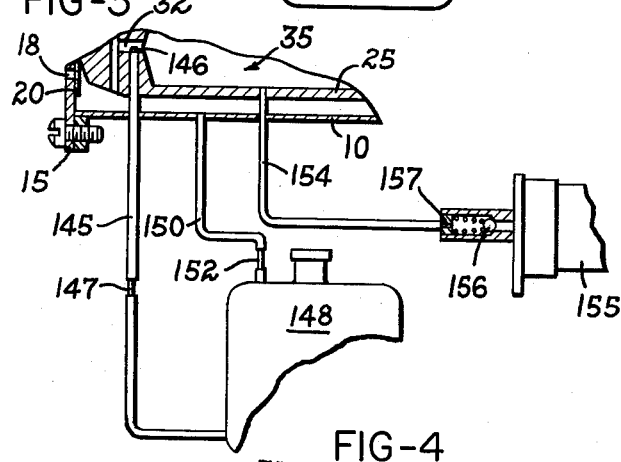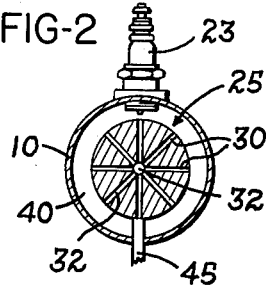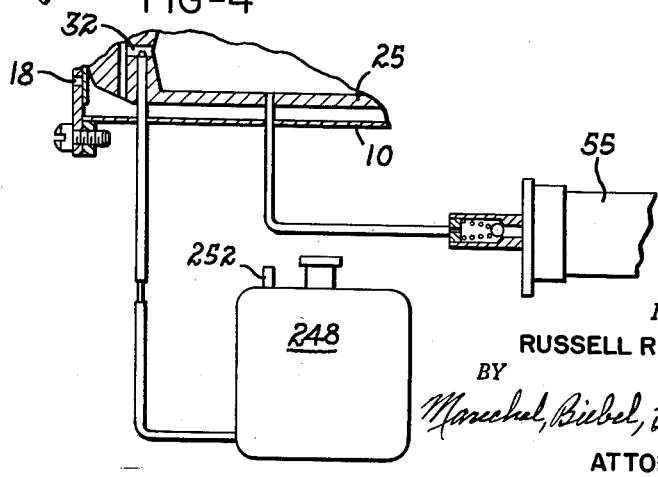
INVENTOR.
RUSSELL R. CURTIS
ATTORNEYS

3,101,768
RESONANT INTERMITTENT COMBUSTION
DEVICES
Russell R. Curtis, Westfield, Ind., assignor to Curtis Automotive Devices, Inc., Westfield, Ind., a corporation of Ohio
Filed Sept. 15, 1960, Ser. No. 56,229
8 Claims. (Cl. 158—4)

This application relates to resonant intermittent combustion devices, particularly to fuel and carburetion systems therefor, both for starting and normal running operation.

Resonant intermittent combustion devices, used for example for propulsive, heating, fog generating, and other purposes, are generally characterized by their simplicity of construction. These devices have but one moving part, and once properly designed and installed, they require very little maintenance. In accordance with this general concept of simplicity in construction, operation, and maintenance, it is desirable to provide starting and running fuel systems which also are of essentially simple and straight-forward construction.

The present invention relates to such fuel systems, and particularly to a carburetion system in which the pressure pulsations due to the intermittent combustion, together with the heat generated by combustion in the device, are utilized to advantage in providing a thoroughly carbureted and essentially uniform fuel air mixture for combustion. At the same time, the fuel system may incorporate a starting arrangement by which a simple source of air under pressure, such as a hand operated air pump, can be manipulated to initiate the supply of a proper fuel air mixture to the combustion chamber for starting purposes.

Accordingly, the primary object of this invention is to provide a novel fuel system for resonant intermittent combustion devices.

Another object of the invention is to provide in such a system a simplified starting arrangement which will afford the proper fuel-air mixture to initiate combustion in the device.

An additional object of the invention is to provide a fuel and carburetion system for resonant intermittent combustion devices wherein a vaporizing chamber is formed in direct heat transfer relation with the combustion chamber of the device, and wherein the interior of such chamber is connected in fluid transfer relation to the combustion chamber such that gases will flow into and out of the chamber in accordance with pressure pulsations resulting from intermittent combustion, and wherein such reversing gas flow into and out of the chamber is utilized to carburete liquid fuel into the gas flow providing a combustible fuel air mixture.

Another object of the invention is to provide in connection with such a vaporizing chamber a starting air and fuel supply system by which an initial quantity of air under pressure is supplied to the vaporizing chamber and simultaneously a starting flow of fuel is established.

Other objects and advantages of the invention will be apparent from the following description, the accompanying drawings and the appended claims.

In the drawing:

FIG. 1 is a somewhat schematic illustration, with some parts broken away and in section, illustrating the general arrangement of a fuel supply and carburetion system in accordance with the invention;

FIG. 2 is a sectional view taken on line 2—2 of FIG. 1;

FIG. 3 is a view of a modified system, showing only related portions of the combustion device and vaporizing chamber; and FIG. 4 is a similar view of another modified form of the invention.

Referring to the drawing, which illustrates preferred embodiments of the invention, in FIG. 1 the combustion device is shown as including a combustion chamber 10, which may for example be formed of relatively thin-walled steel tubing or the like, and including a connecting exhaust cone 12 opening directly into the exhaust tube 14 of the device. This tube thus is in direct gas flow communication with the combustion chamber and forms therewith part of the resonant combustion system. In accordance with principles known in the art, the resonant frequency of the combustion system may be controlled by appropriate dimensioning of the chamber 10 and exhaust tube 14.

Across the other end of the chamber 10 there is an inlet valve plate 15 which is secured in position by screws 16, and which includes a plurality of openings 18 through which air is admitted to the combustion chamber. These openings are controlled by a spring-like valve member 20 which will respond to pressure changes within the combustion chamber to admit air thereinto, and to prevent the exit of products of combustion. A suitable ignitor, for example in the form of a spark plug 23 having its electrodes mounted within the combustion chamber, is provided for initially igniting the combustion mixture to start the device. Once the device has been heated after starting, combustion is self-sustaining and the spark plug may be disconnected from its energizing source.

In accordance with the invention a vaporizing member 25 is mounted within the combustion chamber, for example by means of the central mounting screw 26. The forward end of this chamber may include a curved surface 27 which also functions as a back stop for the valve parts 20, preventing excessive flexing thereof. The vaporizing member preferably is constructed with relatively thick walls, and may be machined from a piece of steel or the like, and may be formed for example as a casting having relatively thick walls. The relatively thick walled construction provides for retention of heat during operation, to further vaporization of the fuel, as will presently be described.

Adjacent its forward end the member 25 is provided with a plurality of transverse, for example generally radial, passages 30 which open into a central restricted orifice 32, and this orifice in turn opens into the large closed carburetor chamber 35 within the vaporizing member. This chamber is closed at its rearward end by a plug or cross partition 37 which may also conveniently form a mounting for a shield or baffle 38. This baffle shields the vaporizing member from the direct heat of burning gases in the combustion chamber, since in operation actual ignition occurs somewhere in the chamber between the shield and the exhaust cone 12.

The member 25 cooperates with the walls of combustion chamber 10 to define a tubular shaped passage 40 through which air admitted through the valve plate passes to the combustion chamber. At the same time, the interior of carburetion chamber 35 communicates with the combustion chamber through the orifice 32 and the passages 30. Thus, pressure in the vaporizing chamber will fluctuate in a following relationship with respect to the pulsating pressures in the combustion chamber resulting from resonant intermittent combustion. There will be a constantly reversing gas exchange between the combustion chamber and the carburetion chamber 35 during normal running operation.

A fuel supply tube 45 terminating in a nozzle 46 opens into the restricted orifice 32. This tube communicates through a metering orifice 47 with a suitable source of fuel, for example the fuel tank 48. During normal running of the device, the positive pressure created in the combustion chamber due to combustion will cause gases to flow inwardly in the passages 30 and through orifice 32 aspirating fuel from nozzle 46 and carrying it into the chamber 35, where the droplets of fuel so delivered will be vaporized by contact with the heated walls of the vaporizing member 25. During the negative pressure portion of the combustion cycle, fresh air is drawn in through the inlet valve member, with the valve 20 opened by the resultant pressure differential, and this air will pass through the space 40 and be mixed with the fuel enriched gases issuing from chamber 35 through the orifice 32 and passages 30. Flow will be induced in this direction since the positive pressure within chamber 35 caused during the explosive combustion will be greater than pressure in the chamber 10 during the negative pressure portion of the combustion cycle. During such opposite flow the fuel-rich gases passing outwardly through orifice 32 will aspirate more fuel from the tube 45 and the entrained fuel will be carried into the combustion chamber.

FIG. 1 also show on convenient system of fuel feeding and starting. A pressurizing line or tube 50 extends from the chamber 35 to the top of fuel tank 48, and includes a suitable restriction 52 in the line which limits the flow between the chamber and the tank. The restriction 52 will vary in size in accordance with different volumes of chamber 35 and tank 48. The passage through the restriction should be so proportioned as to allow positive pressure pulses to pass from chamber 35 to tank 48, and to restrict to some degree a reverse flow of gas from the tank during the negative portion of the cycle, thus establishing a net positive pressure in the fuel tank during operation. Another feature to be considered in proper proportioning of restriction 52 is the requirement from a passage of sufficient size to permit the escape of pressure quickly from the fuel tank when the engine is stopped, to avoid continued flow of fuel through line 45 to the engine.

For starting purposes, a source of starting air under pressure may conveniently be provided by the manually operated reciprocating air pump shown schematically at 55. This source discharges through a check valve 56 and a limiting orifice 57 into a starting air supply line 58 which connects into the line 50 between restriction 52 and chamber 35. The restriction 57 limits the pressure build up in chamber 35 during manipulation of the air pump, and the restriction 52 functions at this time in essentially the same manner as during engine operation, to limit the build up of pressure in fuel tank 48.

Thus, a supply of air under pressure through orifice 57, as by manipulation of pump 55, will create pressure within the carburetion or vaporizing chamber 35, and the resultant air flow out through orifice 32 will cause a negative pressure in the fuel nozzle 46 due to the aspirating effect of the relatively high velocity stream of air passing across the end of the nozzle. Starting fuel flow through line 45 is thus induced by the pressure differential created between the positive pressure in the fuel tank, due to pressure air admitted through restriction 52, and the negative pressure at the nozzle 46. The resultant air-fuel mixture flows outwardly through the passages 30 and into the space 40, and since the valve member 20 is closed, flows through this space toward the combustion chamber. The spark plug 23 is at this time energized from a suitable source to initiate combustion, but, as noted previously, the spark plug may be deenergized as soon as the engine is warm enough to sustain its own ignition.

During running of the engine, the positive pressure created in the carburetion chamber 35 will result in positive pressure pulses being supplied through restriction 52 to the fuel tank, maintaining sufficient positive pressure therein for continued fuel feed as long as the engine operates.

FIG. 3 shows a modified fuel pressurizing and starting air supply arrangement. In this figure the parts of the combustion device are the same, and hence have the same reference numerals as in FIG. 1. The fuel tank 148 supplies fuel through line 145 to the nozzle 146, and includes a fuel flow control orifice or restriction 147. Pressurizing of the fuel tank is accomplished by a pressurizing line 150 including a control restriction 152, and this line extends from the interior of the combustion chamber 10 to the top of fuel tank 148. Positive pressure pulses thus are supplied through line 150 and restriction 152 only during operation of the engine. The starting air supply line 154 is connected to the starting pump 155 through check valve 156 and control restriction 157, and during starting pressure air from the starting air supply is directed only into the vaporizing chamber 35, with the resultant air flow through restriction 32 creating sufficient negative pressure at the nozzle 146 to induce a flow of fuel for starting purposes through line 145.

The modified system shown in FIG. 4 is essentially the same as shown in FIG. 3, and similar reference numerals in the two hundred series are applied to corresponding parts. Here, however, the fuel tank pressurizing line is omitted, and the interior of tank 248 is maintained at atmospheric pressure through the vent 252. In all other respects the system shown in FIG. 4 operates in the same manner as shown in FIG. 3.

Accordingly, the present invention provides a novel simplified fuel supply system for resonant intermittent combustion devices which assures a properly carbureted fuel-air mixture during operation of the device. The flow of gases in constantly exchanging relation between the vaporizing or carburetion chamber and the combustion chamber, in response to the alternating positive and negative pressures in the combustion chamber which result from resonant intermittent combustion, insures a thorough mixing of the liquid fuel with the gases, and the induction of gas and liquid fuel mixture into the vaporizing chamber, during the existence of higher pressure in the combustion chamber than in the vaporizing chamber, permits droplets of liquid fuel to be vaporized in the vaporizing chamber by reason of their contact with the hot walls of such chamber.

The constantly reversing flow of gases across the end of the liquid fuel supply tube provides for essentially continuous supply of fuel through that tube, as distinguished from the somewhat pulsing flow which may occur when the liquid fuel is mixed with air exteriorly of the combustion chamber, and particularly in the pulsing air flow through the inlet valve of such resonant combustion devices. Therefore, it is possible to use a somewhat smaller supply tube, or conversely to operate with a fuel supply tube of normal diameter but at lower flow rates.

The invention also provides a novel starting air and fuel supply system wherein the connection of a source of starting air under pressure to the interior of the vaporizing chamber immediately provides a starting fuel-air mixture into the combustion chamber. Since substantial air pressure can be built up within the relatively small volume of the vaporizing chamber, and this pressure can be relieved only by escape of air through the restricted passage opening into the combustion chamber, and over the fuel supply nozzle, a thorough air-fuel mixture is obtained for starting and supplied directly into the combustion chamber, and without the necessity of overcoming any resistance to flow of the main air inlet valve.

While the forms of apparatus herein described constitute preferred embodiments of the invention, it is to be understood that the invention is not limited to these precise forms of apparatus, and that changes may be made therein without departing from the scope of the invention as defined in the appended claims.

What is claimed is:

1. In combination with a resonant intermittent combustion device having a combustion chamber opening at one end into an exhaust pipe and having an inlet end including inlet port means and a flow control valve means controlling the inflow of air through said port means providing for air flow therethrough only into said chamber, means forming a carburetion vaporizing member in direct heat exchange relation with said combustion chamber providing for heating of said member as a result of combustion in said chamber, said member including a closed carburetion chamber therein, means forming a passage from said carburetion chamber to said combustion chamber providing for reversing exchange flow of gases therebetween in response to resonant intermittent combustion in said combustion chamber, and means supplying liquid fuel into said pasage means for aspiration of the liquid fuel into gas flow moving in either direction through said passage means.

2. In combination with a resonant intermittent combustion device having a combustion chamber opening at one end into an open exhaust pipe and having an inlet end including inlet port means provided with a flow control valve controlling flow through said port means and arranged to pass air into said chamber and to obstruct flow from said chamber, a fuel supply system including a hollow closed vaporizer mounted in said chamber adjacent said inlet end, the walls of said vaporizer defining with the walls of said chamber a passage for flow of gas in the device, means providing a flow path between said passage and the interior of said vaporizer through which a reversing flow of gases will pass in accordance with the fluctuations of pressure in said chamber resulting from intermittent resonant combustion therein, a starting air source connected to discharge a supply of air under pressure into said vaporizer for inducing an initial flow of air from the interior of said vaporizer through said flow path into said gas flow passage in the device, and a fuel supply tube adapted for connection to a fuel tank and opening into said flow path for aspiration of fuel from said tube into the flow path between said vaporizer and said gas flow passage.

3. In combination with a resonant intermittent combustion device having a combustion chamber opening at one end into an open exhaust pipe and having an inlet end including inlet port means provided with a flow control valve controlling flow through said port means and arranged to pass air into said chamber and to obstruct flow from said chamber, a fuel supply system including a hollow closed vaporizer mounted in said chamber adjacent said inlet end, the walls of said vaporizer defining with the walls of said chamber a passage for flow of gas in the device, means providing a flow path between said passage and the interior of said vaporizer through which a reversing flow of gases will pass in accordance with the fluctuations of pressure in said chamber resulting from intermittent resonant combustion therein, a starting air source connected to discharge a supply of air under pressure into said vaporizer for inducing an initial flow of air from the interior of said vaporizer through said flow path into said gas flow passage in the device, a fuel supply tube adapted for connection to a fuel tank and opening into said flow path for aspiration of fuel from said tube into said flow path between said vaporizer and said gas flow passage, and a metering orifice in said fuel supply tube controlling the quantity of fuel aspirated therethrough.

4. In combination with a resonant intermittent combustion device having an elongated combustion chamber opening at one end into an open exhaust pipe of predetermined length and having an inlet end including inlet port means and an air flow control means for said inlet port means arranged to pass air into said chamber and to obstruct flow from said chamber, a fuel mixture supply system including a hollow substantially closed vaporizer mounted in said chamber adjacent said inlet end, the walls of said vaporizer defining with the walls of said chamber a passage for flow of gas in the device, means providing a restricted flow path between said passage and the interior of said vaporizer through which a reversing flow of gases will pass in accordance with the fluctuations of pressure in said chamber resulting from intermittent resonant combustion therein, a fuel tank pressurizing conduit extending from said device and adapted for connection to a fuel supply tank, said conduit including a restriction to limit pressure build up in the tank, a starting air pump connected to discharge a supply of air under pressure into said vaporizer for inducing an initial flow of air from the interior of said vaporizer through said flow path into said gas flow passage in the device, and a fuel supply tube adapted for connection to the fuel tank and opening into said restricted flow path for aspiration of fuel from said tube into the flow path between said vaporizer and said gas flow passage.

5. In combination with a resonant intermittent combustion device having an elongated combustion chamber connected at one end into an open exhaust pipe of predetermined length and having an inlet end including inlet port means and an air flow control valve arranged to pass air through said port means into said chamber and to obstruct flow from said chamber through said port means, a fuel mixture supply system including a hollow closed vaporizer mounted in said chamber, means providing a restricted flow path between said chamber and the interior of said vaporizer through which a reversing flow of gases will pass in accordance with the fluctuations of pressure in said chamber resulting from intermittent resonant combustion therein, means limiting the transfer of heat from combustion in said chamber to said vaporizer, a fuel tank pressurizing conduit extending from said device and adapted for connection to a fuel supply tank, a starting air source connected to discharge a supply of air under pressure into said vaporizer for inducing an initial flow of air from the interior of said vaporizer through said flow path into said combustion chamber, and a fuel supply tube adapted for connection to the fuel tank and opening into said restricted flow path for aspiration of fuel from said tube into the flow path between said vaporizer and said chamber.

6. In a resonant intermittent combustion device having an elongated combustion chamber connected into an open exhaust pipe and having an inlet provided with an air flow control valve arranged to pass air into said chamber and to obstruct flow from said chamber, a fuel supply system including a hollow closed vaporizer mounted in said chamber adjacent said inlet, means providing a restricted flow path between said chamber and the interior of said vaporizer through which a reversing flow of gases will pass in accordance with the fluctuations of pressure in said chamber resulting from intermittent resonant combustion therein, a fuel tank, a pressurizing conduit extending from said device and connected to said fuel tank, a restriction in said conduit limiting pressure build up in said tank, a starting air source connected to discharge a supply of air under pressure into said vaporizer for inducing an initial flow of air from the interior of said vaporizer through said flow path into said combustion chamber, and a fuel supply tube extending from said fuel tank and opening into said restricted flow path for supply of fuel from said tube into the reversing flow path between said vaporizer and said combustion chamber.

7. In a resonant intermittent combustion device having an elongated combustion chamber connected into an open exhaust pipe and having an inlet provided with an air flow control valve arranged to pass air into said chamber and to obstruct flow from said chamber, a fuel supply system including a hollow closed vaporizer mounted in said chamber adjacent said inlet, means providing a restricted flow path between said chamber and the interior of said vaporizer through which a reversing flow of gases will pass in accordance with the fluctuations of pressure in said chamber resulting from intermittent resonant combustion therein, a fuel tank, a pressurizing conduit extending from said device and connected to said fuel tank, a restriction in said conduit limiting pressure build up in said tank, a starting air source connected to discharge a supply of air under pressure through said conduit into said vaporizer and into said tank for inducing an initial flow of air from the interior of said vaporizer through said flow path into said combustion chamber, and a fuel supply tube extending from said fuel tank and opening into said restricted flow path for supply of fuel from said tube into the reversing flow path between said vaporizer and said combustion chamber.

8. In combination with a resonant intermittent combustion device having an elongated combustion chamber opening at one end into an open exhaust pipe of predetermined length and having an inlet end including inlet port means and an air flow control means for said port means arranged to pass air into said chamber and to obstruct flow from said chamber, a fuel supply system including a hollow closed vaporizer mounted in heat exchange relation with said chamber, means providing a flow path between a point in said chamber adjacent said inlet end of said combustion chamber and the interior of said vaporizer through which a reversing flow of gases will pass in accordance with the fluctuations of pressure in said chamber resulting from intermittent resonant combustion therein, a fuel tank, a starting air source connected to discharge a supply of air under pressure into said vaporizer for inducing an initial flow of air from the interior of said vaporizer through said flow path into said combustion chamber, and a fuel supply tube connected to said fuel tank and opening into said flow path for aspiration of fuel from said tube into the flow path between said vaporizer and said chamber.

References Cited in the file of this patent

UNITED STATES PATENTS

| | | |
|---|---|---|
| 2,443,707 | Korsgren | June 22, 1948 |
| 2,639,580 | Stuart | May 26, 1953 |
| 2,715,436 | Lafferentz et al. | Aug. 16, 1955 |
| 2,717,637 | Huber | Sept. 13, 1955 |
| 2,719,580 | Haag et al. | Oct. 4, 1955 |
| 2,836,036 | Drage | May 27, 1958 |
| 2,926,855 | Durr et al. | Mar. 1, 1960 |

FOREIGN PATENTS

| | | |
|---|---|---|
| 922,731 | Germany | Jan. 24, 1955 |